(Model.)

W. N. BARTHOLOMEW.
PENCIL POINTER.

No. 288,156. Patented Nov. 6, 1883.

Witnesses
George R. Tolman
William B. Luce

Inventor:
William N. Bartholomew

UNITED STATES PATENT OFFICE.

WILLIAM N. BARTHOLOMEW, OF NEWTON, MASSACHUSETTS.

PENCIL-POINTER.

SPECIFICATION forming part of Letters Patent No. 288,156, dated November 6, 1883.

Application filed April 11, 1883. (Model.)

*To all whom it may concern:*

Be it known that I, WILLIAM N. BARTHOLOMEW, a citizen of the United States, residing at Newton, in the county of Middlesex and State of Massachusetts, have invented a Pencil-Pointer, of which the following is a specification.

The special purpose which I have had in view, and claim to have attained by my invention, is to provide for use in the school-room an implement for pointing pencils, which is always in good condition for the purpose, and can be used without soiling the fingers, and with as little waste as possible of the material of the pencil, and which, when not in use, confines the pencil-dust in a suitable receptacle and keeps it from contact with the books and papers and other things in the pupil's desk.

Figure 1:
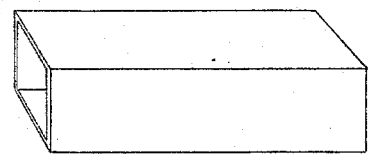
Figure 2:
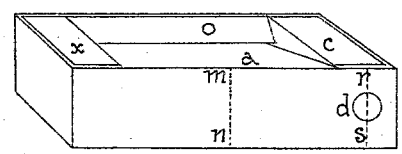
Figure 3:
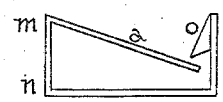
Figure 4:
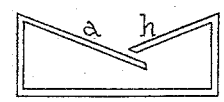
Figure 5:
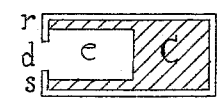
Figure 6:
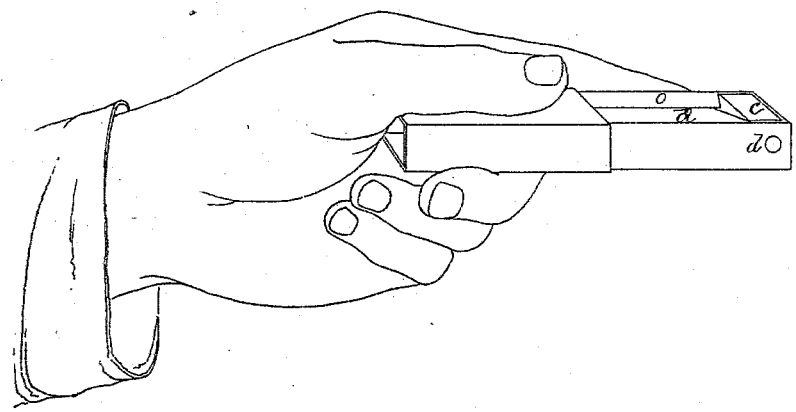

The following is a specification of my said invention:

Figure 1 is a view in perspective of a case, into which slides a box, Fig. 2. Figs. 3 and 5 are cross-sections of the box through the lines $m\,n$ and $r\,s$. Fig. 4 is a cross-section of a different box. Fig. 6 is a view in perspective of the implement in use.

$a$ is a slanting plate covered with some gritty substance, with an open space at its lower edge opening into the bottom of the box. $c$ is a block with a hole, $e$, in it, filled with cotton. $d$ is a hole in the side of the box, a little smaller than $e$. $o$ is a second plate or ledge, slanting downward and overlapping plate $a$, with an open space also at its lower edge. It may or may not be covered with grit. $x$ is a second block, which may or may not have a hole in it, like $c$, on the side of the box which is turned away from the eye, filled with cotton, and accessible through a smaller hole, like $d$, in the side of the box—that is, the implement may be single or double. If double, it may be handled and used either end first.

The mode of using it is as follows: The wood having been first removed to expose a sufficient portion of the lead, a point may be given to the pencil by rubbing it upon the plate $a$ with a rolling motion. The point is freed from dust by inserting it through the hole $d$ and turning it round in the cotton. A finer, smoother, and cleaner point can thus be given to it than can be made by a knife, however sharp, and the point can be renewed as often as necessary with the least possible waste of the pencil. The pencil-dust works its way down the slanting surface of the plate $a$ and falls into the bottom of the box through the space left for the purpose. In this receptacle it is not likely to be spilt, even if the box be upset while in use. It must get out the way it got in, which is next to impossible. When not in use, the box can be kept closed, confining the dust and keeping the surface of the plate $a$ from contact with external objects. The case, Fig. 1, permits the box to be held tight in the left hand while in use, being made of some flexible material, and the block $x$ assists the grip. The box is thus prevented from sliding in or out during the operation of pointing the pencil. A strip of cloth or felt fixed in any convenient position within the box, accessible from the top, answers the same purpose as the cotton, enabling me to dispense with the block $c$ and hole $d$.

I am aware that patents have been granted for pencil-pointers, in some respects resembling mine, to Burgess, May 28, 1867, No. 65,165; DeZeng, February 6, 1872, No. 123,462; Suter, March 23, 1880, No. 225,732.

I claim—

As a new article of manufacture, a pencil-pointer consisting of a box sliding within a protecting-case, and provided with the dust-receiver, the two overlapping plates, the lower of which has an erosive surface, and the cleansing-compartment, all substantially as shown and described.

WILLIAM N. BARTHOLOMEW.

Witnesses:
GEORGE W. PIERCE,
ARTHUR E. DENISON.